United States Patent
Lefevre et al.

(10) Patent No.: US 12,162,195 B2
(45) Date of Patent: Dec. 10, 2024

(54) METHOD FOR MANUFACTURING AN APPLICATION MEMBER FOR APPLYING LIQUID COSMETIC PRODUCT, APPLICATION MEMBER AND APPLICATOR

(71) Applicant: Parfums Christian Dior, Paris (FR)

(72) Inventors: Savine Lefevre, Compiegne (FR); François Gautier, Colombes (FR)

(73) Assignee: Parfums Christian Dior, Paris (FR)

( * ) Notice: Subject to any disclaimer, the term of this patent is extended or adjusted under 35 U.S.C. 154(b) by 1482 days.

(21) Appl. No.: 16/472,672

(22) PCT Filed: Dec. 21, 2017

(86) PCT No.: PCT/FR2017/053760
§ 371 (c)(1),
(2) Date: Jun. 21, 2019

(87) PCT Pub. No.: WO2018/115759
PCT Pub. Date: Jun. 28, 2018

(65) Prior Publication Data
US 2019/0358876 A1 Nov. 28, 2019

(30) Foreign Application Priority Data
Dec. 23, 2016 (FR) ..................... 1663332

(51) Int. Cl.
*B29C 45/14* (2006.01)
*A45D 34/04* (2006.01)
(Continued)

(52) U.S. Cl.
CPC ........ *B29C 45/14795* (2013.01); *A45D 34/04* (2013.01); *B29C 67/205* (2013.01);
(Continued)

(58) Field of Classification Search
CPC ... B29C 33/0033; B29C 70/547; B29C 67/20; B29C 45/345; B29C 45/1736;
(Continued)

(56) References Cited

U.S. PATENT DOCUMENTS

| 2005/0063768 A1* | 3/2005 | Tani | ........................ B43K 8/00 401/277 |
| 2005/0102978 A1 | 5/2005 | Gueret | |

(Continued)

FOREIGN PATENT DOCUMENTS

| CN | 1270131 A | 10/2000 |
| CN | 1310973 A | 9/2001 |

(Continued)

OTHER PUBLICATIONS

1 Notice of Rejection for JP Patent Application No. 2019-534286 mailed Mar. 11, 2022.

(Continued)

*Primary Examiner* — Stella K Yi
(74) *Attorney, Agent, or Firm* — Perilla Knox & Hildebrandt LLP; Stephanie L. Davy-Jow; Kenneth A. Knox

(57) ABSTRACT

The disclosure provides a method of fabricating an applicator member for applying a liquid cosmetic, the method comprising a step of making a porous core out of sintered material and a step of overmolding a shell on the porous core, the shell including at least one inlet orifice for admitting liquid cosmetic into the core and at least one dispenser orifice for dispensing liquid cosmetic by means of the core. The disclosure also provides an applicator member obtained by the method and an applicator comprising such an applicator member and a reservoir.

13 Claims, 1 Drawing Sheet

(51) Int. Cl.
- *B29C 67/20* (2006.01)
- *B29C 69/02* (2006.01)
- *B29K 23/00* (2006.01)
- *B29L 9/00* (2006.01)
- *B29L 31/00* (2006.01)

(52) U.S. Cl.
CPC ........ *B29C 69/02* (2013.01); *A45D 2200/054* (2013.01); *B29C 2045/14803* (2013.01); *B29K 2023/06* (2013.01); *B29K 2023/12* (2013.01); *B29K 2995/0097* (2013.01); *B29L 2009/00* (2013.01); *B29L 2031/718* (2013.01)

(58) Field of Classification Search
CPC .............. B29C 44/356; B29C 33/3814; B29C 2045/14803; B29C 45/14795
See application file for complete search history.

(56) References Cited

U.S. PATENT DOCUMENTS

| | | | |
|---|---|---|---|
| 2006/0233594 | A1 | 10/2006 | Erickson |
| 2008/0063463 | A1 | 3/2008 | Hori |
| 2011/0125111 | A1* | 5/2011 | Chibret .................. B65D 47/18 604/300 |
| 2015/0150719 | A1 | 6/2015 | Chibret et al. |

FOREIGN PATENT DOCUMENTS

| | | |
|---|---|---|
| CN | 1344664 A | 4/2002 |
| CN | 1471876 A | 2/2004 |
| CN | 1738558 A | 2/2006 |
| CN | 1903672 A | 1/2007 |
| CN | 1972812 A | 5/2007 |
| CN | 102112377 A | 6/2011 |
| CN | 103796549 A | 5/2014 |
| EP | 0479320 A1 | 8/1992 |
| FR | 2805720 | 9/2001 |
| FR | 2876557 | 4/2006 |
| JP | 2514906 Y2 | 10/1996 |
| JP | 2001299443 A | 10/2001 |
| JP | 2005178296 A | 7/2005 |
| JP | 2006075607 A | 3/2006 |
| JP | 2007283124 A | 11/2007 |
| JP | 2009269247 A | 11/2009 |
| JP | 2011529425 A | 12/2011 |
| TW | 366737 U | 8/1999 |
| WO | 0165937 | 9/2001 |
| WO | 2010013131 | 2/2010 |
| WO | 2010013131 A1 | 2/2010 |

OTHER PUBLICATIONS

International Search Report and Written Opinion dated Mar. 27, 2018 for PCT Application No. PCT/FR2017/053760.
Decision of Rejection for Chinese Patent Application for 201780087304.8 mailed Sep. 27, 2021.
First Office Action for CN Patent Application No. 201780087304.8 mailed Oct. 27, 2020.
Decision of Rejection for Japanese Patent Application for 2019-534286 mailed Nov. 22, 2021.

* cited by examiner

METHOD FOR MANUFACTURING AN APPLICATION MEMBER FOR APPLYING LIQUID COSMETIC PRODUCT, APPLICATION MEMBER AND APPLICATOR

CROSS-REFERENCE TO RELATED APPLICATIONS

The present application is a § 371 national phase application of PCT Application No. PCT/FR2017/053760 filed Dec. 21, 2017, which claims the benefit of and priority to French Patent Application No. 16 63332, filed on Dec. 23, 2016, the contents of which are hereby incorporated by reference in their entirety herein.

BACKGROUND OF THE INVENTION

The present disclosure relates to a method of fabricating an applicator member for applying a cosmetic, in particular a cosmetic that is liquid or semi-liquid, e.g. cosmetic oils, fragrances, fluid foundations, or makeup in particular for the lips.

Liquid applicators are known that comprise a foam pad that becomes filled with liquid by capillarity. The liquid is applied by contact between the pad soaked in the liquid and a user, in particular with the user's skin. Nevertheless, the quantity of liquid that is applied depends on the pressure exerted on the pad by the user, thereby compressing the pad and expelling the liquid contained in the pad. There is therefore a non-negligible risk of the liquid running, which is not desirable.

There thus exists a need for an applicator member that enables the quantity of liquid that is applied to be better controlled, and for a method of fabricating such an applicator member.

OBJECT AND SUMMARY OF THE INVENTION

The present disclosure seeks to remedy those drawbacks, at least in part.

To this end, the present disclosure provides a method of fabricating an applicator member for applying a liquid cosmetic, the method including the following steps:

making a porous core out of sintered material; and overmolding a shell on the porous core, the shell having at least one inlet orifice for admitting liquid cosmetic into the core and at least one dispenser orifice for enabling the core to dispense liquid cosmetic.

The term "porous core" is used to mean a core having open pores to enable a liquid to flow through the core by capillarity.

Since the porous core is made of sintered material, the porous core is rigid or capable of being compressed only very little, and it is insensitive to pressure applied by a user. Thus, the porous core does not deform, or it deforms very little, under any pressure applied by the user, thereby avoiding liquid being expelled by the core being compressed.

In addition, since the shell is overmolded on the porous core, sealing is established between the core and the shell. Typically, the applicator member is obtained by placing the porous core in a mold and by injecting into the mold the fluid material that is to form the shell, once it has solidified. The pressure with which the fluid material is injected into the mold serves to press the fluid material between the mold and the porous core, so as to establish sealing between the core and the overmolded shell without spoiling the porous structure inside the core.

The liquid cosmetic inlet orifice enables the liquid cosmetic to penetrate into the porous core, and the liquid cosmetic dispenser orifice enables the liquid cosmetic to leave the core so as to be dispensed when the user places the applicator member on the skin by putting the core that is accessible through the dispenser orifice into contact against the skin. The liquid cosmetic is thus channeled between the inlet orifice and the dispenser orifice for the liquid cosmetic.

The liquid cosmetic may then be dispensed via the dispenser orifice in the overmolded shell. Thus, only the portions of the core that are not covered by the overmolded shell enable liquid cosmetic to be dispensed. This makes it possible to have an applicator member that is clean and that does not become dirty on the overmolded shell, and to limit the portion of the porous core that is visible through the dispenser orifice and that comes into contact with the user's skin.

It can be understood that the overmolded shell may have a plurality of inlet orifices and/or plurality of dispenser orifices. The dimensioning of each of these orifices serves to define the optimum flow rate for application of the liquid.

Since the core is porous, sealing may be obtained mechanically during the step of overmolding the shell on the core. Specifically, the material forming the shell may penetrate a little into the open pores of the core and thus form numerous points for anchoring the shell on the core.

A liquid cosmetic applicator member is thus obtained that enables the liquid cosmetic to be dispense cleanly, independently of the pressure applied by the user on the applicator member.

The making of the porous core may include a step of machining the porous core.

Since the porous core is made of sintered material, the porous core is rigid and may be machined easily.

It is thus easy to form projections on the surface of the porous core. By way of example, once the shell has been overmolded on the porous core, these projections may project out from the overmolded shell through the dispenser orifices. The surfaces of the projections that are arranged outside the overmolded shell together form an applicator surface for applying the liquid cosmetic.

The projections may form a pattern that projects from the overmolded shell.

It is possible to combine the function of dispensing the liquid cosmetic with an appearance function and/or a functional function, e.g. massaging during application. The overmolded shell may cover a specific portion of the porous core, between the projections, and may form a pattern such as a logo or decoration. The outside surface of the shell may be smooth. In addition, or as an alternative, the outside surface of the shell may have a surface state or pattern, e.g. for the purpose of massaging during application.

The sintered material may comprise a polyolefin, for example polypropylene or polyethylene.

Polyolefins are saturated aliphatic polymers that are chemically very inert, i.e. they react little or not at all with the substances that come into contact with them. In particular, polypropylene is a polyolefin that is inexpensive, odorless, and non-toxic, and polypropylene is a polyolefin that is inexpensive and strong.

The sintered material may comprise a polyester, for example polyethylene terephthalate (PET), or glass.

Glass is a material that is inert and may also give the user a sensation of freshness when the core is in contact with the skin of the user.

The overmolded shell may comprise a polymer comprising a polyolefin, for example polypropylene or polyethylene.

Polyolefins are saturated aliphatic polymers that are chemically very inert, i.e. they react little or not at all with the substances that come into contact with them. In particular, polypropylene is a polyolefin that is inexpensive, odorless, and non-toxic, and polypropylene is a polyolefin that is inexpensive and strong.

When the porous core and the overmolded shell comprise a polyolefin, for example, in addition to the sealing that is obtained mechanically, chemical bonding may also take place between the porous core and the shell while the shell is being overmolded on the porous core. Sealing between the porous core and the overmolded shell is thus improved.

The overmolded shell may comprise a polymer comprising a polyester, for example polyethylene terephthalate or PCTA.

Polyesters, e.g. such as PET, in addition to their appearance effect of presenting a very shiny surface, also enable the shell to be made to be transparent, in particular if it is desired for the core to remain visible. The term "PCTA" covers a family of amorphous copolyesters comprising polycyclohexylenedimethylene terephthalate copolymerized with another (phthalic) diacid.

Likewise and for example, when the porous core and the overmolded shell comprise a polyester, in addition to the sealing that is obtained mechanically, chemical bonding may take place between the porous core and the shell during overmolding of the shell on the porous core. Sealing between the porous core and the overmolded shell is then improved.

The overmolded shell may comprise a flexible polymer, for example a sequenced styrene-ethylene-butylene-styrene (SEBS) copolymer.

The flexible polymer serves in particular to make an overmolded shell that is transparent, enabling the porous core and the liquid cosmetic to be seen through the overmolded shell. The flexible polymer also provides comfort in application with a sensation of flexibility and softness.

The overmolded shell may have thickness less than 2.0 millimeters (mm), preferably less than 1.5 mm, more preferably less than 1.0 mm.

The thickness of the overmolded shell is relatively thin. For given overall size, most of the volume is occupied by the core. It is thus possible to have a core of large volume, thereby enabling great stability to be obtained in the dispensing of the liquid.

The overmolded shell may include a fastener skirt for fastening the applicator member on a reservoir.

It is thus easy to fasten the applicator member on the reservoir containing the liquid cosmetic. Furthermore, since the fastener skirt is made integrally with the overmolded shell, i.e. since the fastener skirt is made with the same material as the overmolded shell, there are fewer parts that need to be assembled together in order to fabricate a liquid cosmetic applicator including such an applicator member. This leads to fewer assembly steps. Fabrication of the applicator is thus simplified. Alternatively, the applicator member is fastened to the reservoir by means of a ferrule. The overmolded shell may also include the sealing means between the reservoir and the applicator, e.g. a lip or a gasket. The walls of the reservoir may be rigid or flexible.

The present disclosure also provides a liquid cosmetic applicator member obtained by overmolding a shell on a porous core made of sintered material.

The present disclosure also provides an applicator for a liquid cosmetic for dispensing the applicator comprising a reservoir for containing the liquid cosmetic for dispensing and an applicator member as defined above, the applicator member being assembled on the reservoir.

BRIEF DESCRIPTION OF THE DRAWING

Other characteristics and advantages of the invention appear from the following description of implementations of the invention given as non-limiting examples and with reference to the accompanying figures, in which.

DETAILED DESCRIPTION OF THE INVENTION

Figure 1:
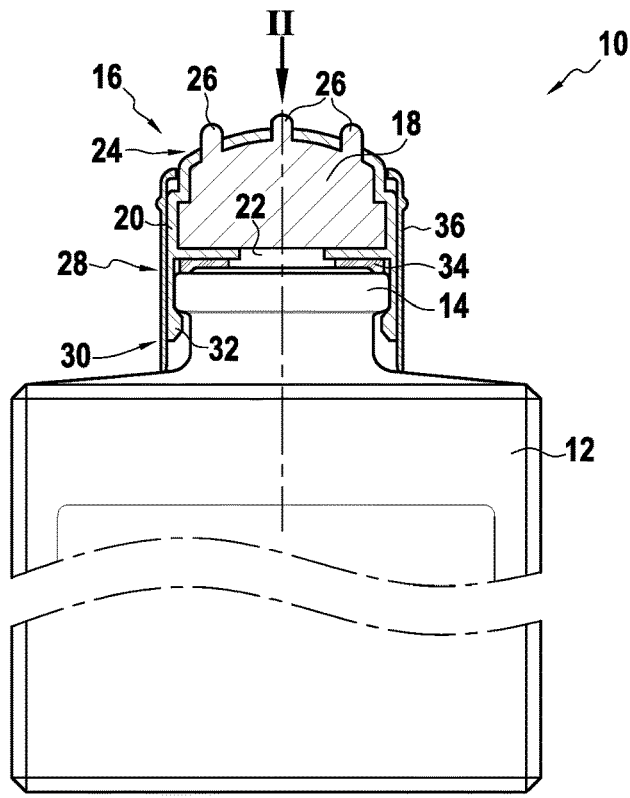
FIG. 1 is a section view of a liquid cosmetic applicator obtained by a fabrication method according to an embodiment of the present disclosure.

FIG. 1 is a section view of a liquid cosmetic applicator 10.

The applicator 10 comprises a reservoir 12 having a neck 14 and an applicator member 16 for applying liquid cosmetic and that is assembled on the neck 14 of the reservoir. The reservoir 12 has walls that are rigid. Alternatively, the reservoir 12 may have walls that are flexible. The liquid cosmetic is contained in the reservoir 12.

The applicator member 16 has a porous core 18 made of sintered material. As an example of a porous core made of sintered material, mention may be made of a porous core comprising polypropylene marketed under the trademark Porex™, e.g. as defined in Document WO 2008/021539, to which the reader may refer. The porous core 18 has open pores. For example, the pores may be of a size lying in the range 7 micrometers (μm) to 300 μm, preferably in the range 30 μm to 150 μm, and the volume porosity, defined as the ratio of empty volume over the total volume, may lie in the range 10 vol % to 70 vol %, and preferably in the range 20 vol % to 50 vol %.

The applicator member 16 also has a shell 20 overmolded on the porous core 18. By way of example, the shell 20 may be made of polypropylene.

The shell 20 overmolded on the porous core 18 covers the entire porous core 18, with the exception of an inlet orifice 22 for admitting liquid cosmetic into the porous core 18, and of a plurality of dispensing orifices 24 for dispensing the liquid cosmetic from the porous core 18, i.e. by means of the porous core 18.

In FIG. 1, in the section view, the shell 20 overmolded on the porous core 18 has three dispenser orifices 24.

Figure 2:
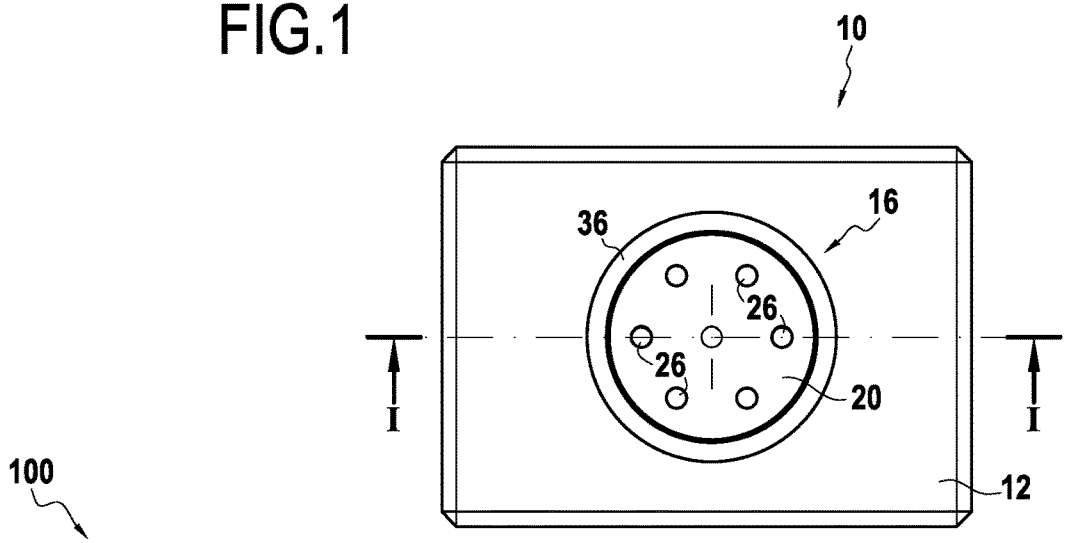
FIG. 2 is a perspective view from above of the FIG. 1 applicator.

As shown in the embodiment of FIG. 2, the shell 20 overmolded on the porous core 18 has seven dispenser orifices 24.

In the flow direction of the liquid cosmetic during application, i.e. while the liquid cosmetic is being dispensed from the reservoir 12 to the outside of the applicator 10, with the applicator member 16 assembled on the reservoir 12, the inlet orifice 22 for admitting the liquid cosmetic into the porous core 18 is arranged upstream from the porous core 18, and the liquid cosmetic dispenser orifices 24 are arranged downstream relative to the inlet orifice 22. Thus, when the applicator member 16 is assembled on the reservoir 12, it should be observed that the inlet orifice 22 is arranged facing the opening defined by the neck 14 of the reservoir 12, and the dispenser orifices 24 are freely accessible from outside the applicator 10.

The porous core 18 has projections 26 on the surface of the porous core 18. Once the shell 20 has been overmolded onto the porous core 18, these projections 26 project from the overmolded shell 20 through the dispenser orifices 24. The surfaces of the projections 26 are arranged outside the overmolded shell 20 and together they form a surface for applying the liquid cosmetic.

The projections 26 may form a pattern that projects from the overmolded shell 20. The overmolded shell 20 may thus cover a specific portion of the porous core 18 between the projections 26, and they may form a pattern such as a logo or decoration.

In FIG. 1, the overmolded shell 20 has a fastener skirt 28 for fastening the applicator member 16 on the reservoir 12. The fastener skirt 28 of the applicator member 16 is formed during overmolding of the shell 20 on the porous core 18. The fastener skirt 28 comprises a plurality of resilient tabs, each having a free end 30 with an internal rib 32 configured to co-operate with the neck 14 of the reservoir 12.

The applicator 10 also has a sealing gasket 34 arranged between the neck 14 of the reservoir 12 and the applicator member 16, more particularly a sealing gasket 34 of annular shape arranged between the neck 14 of the reservoir 12 and the overmolded shell 20 in order to avoid the liquid cosmetic passing between the applicator member 16 and the reservoir 12. The sealing gasket 34 may be a separate fitting or it may form an integral portion of the shell 20.

In the embodiment of FIG. 1, the applicator 10 also has a fastener ferrule 38 of shape complementary to the shape of the fastener skirt 28 and that prevents the resilient tabs of the fastener skirt 28 from moving radially. The fastener ferrule 38 blocks the resilient tabs in a configuration for fastening the applicator member 16 on the neck 14 of the reservoir 12. Alternatively, the fastener ferrule 38 could include the fastener tabs and serve to hold the applicator member 16 axially, which member would then not have any fastener tabs.

By way of example, the overmolded shell 20 may present thickens of 0.8 mm, the porous core 18 may be generally in the shape of a cylinder having a diameter of about 15 mm and a maximum height, ignoring the projections 26, of about 7 mm. The inlet orifice 22 may present a diameter of about 6 mm, and the dispenser orifices 24 may each present a diameter of about 2 mm.

Figure 3:
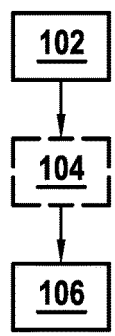
FIG. 3 is a flow chart showing the steps of the method of fabricating the liquid cosmetic applicator member shown in FIG. 1.

The method 100 of fabricating the applicator member 16 is shown in FIG. 3.

During a first step 102, the porous core 18 is made of sintered material. The porous core 18 may be obtained by sintering beads of polypropylene in a sintering mold. The sintering mold may include recesses that correspond to the projections 26 of the porous core 18. The projections 26 may be flush with the outside surface of the shell 20 or they may extend beyond the outside surface, by way of example they may extend beyond the outside surface by a maximum of 5 mm, or a maximum of 2 mm, or preferably a maximum of 1 mm.

Thereafter, in a second step 106, the shell 20 is overmolded on the porous core 18. Thereafter, the porous core 18 is placed in an injection mold and the material that is to form the shell 20 is injected into the injection mold, between the injection mold and the porous core 18 so as to overmold the shell 20 on the porous core 18.

Parameters for overmolding are themselves known and may easily be determined as a function of the injected material.

The injected material is sufficiently fluid, i.e. its viscosity is sufficiently low, to enable it to penetrate into the injection mold between the walls of the injection mold and the porous core 18. The injected material also presents viscosity that is sufficiently high to avoid closing all of the open pores of the porous core 18 under the effect of being injected under pressure.

During the second step 104, it is also possible to inject the material for forming the fastener skirt 28 for fastening the applicator member 16 on the reservoir 12.

Alternatively, the sintering mold need not include recesses and the porous part made of sintered material that is obtained after sintering the polypropylene beads may be generally cylindrical in shape, for example. The porous sintered material is then machined during a machining step 104 that is performed between the first step 102 and the second step 106, so as to form the projections 26 on a face of the porous part. This serves to obtain the porous core 18.

Alternatively, the core 18 is molded directly into shape, in particular with its projections 26. Furthermore, the sintering mold may include projections for forming recesses in the porous core 18.

It can be understood that the machining step 104 is optional and depends on the first step 102 during which the porous core 18 is made. It can be understood that even if the porous core 18 is obtained by molding in a sintering mold that has recesses for forming the projections 26 of the porous core 18, it is possible subsequently to perform a machining step 104, e.g. in order to perform a step of finishing the projections 26.

It may be observed that the open pores of the porous core 18 may be selected as a function of the liquid cosmetic that is to be dispensed, in particular as a function of the viscosity of said liquid. Conversely, it is possible to adapt the formulation of the liquid cosmetic for dispensing as a function of the open pores of the porous core 18.

Although the present disclosure is described with reference to a specific implementation, it is clear that various modifications and changes may be undertaken thereon without going beyond the general ambit of the invention as defined by the claims. In addition, individual characteristics of the various implementations mentioned may be combined in additional implementations. Consequently, the description and the drawings should be considered in a sense that is illustrative rather than restrictive. In particular, it can be understood that the number and locations of the inlet and liquid cosmetic dispensing orifices may vary. In addition, the shape of the projections may vary and it is not limited to the rounded cylindrical shape shown in the figures. The technique for fastening the applicator member on the reservoir may be different. For example, the fastener skirt may be screwed onto the neck of the reservoir.

The invention claimed is:

1. A method of fabricating an applicator member for applying a liquid cosmetic, the method comprising:
   making a porous core out of sintered material to form a plurality of pores such that the liquid cosmetic flows through the core by capillarity; and
   overmolding a shell on the porous core, the shell having at least one inlet orifice for admitting the liquid cosmetic into the porous core and at least one dispenser orifice for enabling the porous core to dispense the liquid cosmetic, wherein the porous core comprises at least one projection that projects out from the overmolded shell through the at least one dispenser orifice.

2. The method according to claim 1, wherein the making of the porous core comprises machining the porous core.

3. The method according to claim 1, wherein the sintered material comprises a polyolefin.

4. The method according to claim 1, wherein the sintered material comprises a polyester or glass.

5. The method according to claim 1, wherein the overmolded shell comprises a polymer comprising a polyolefin.

6. The method according to claim 1, wherein the overmolded shell comprises a polymer comprising a polyester.

7. The method according to claim 1, wherein the overmolded shell comprises a flexible polymer.

8. The method according to claim 1, wherein the overmolded shell has thickness less than 2.0 mm.

9. The method according to claim 1, wherein the overmolded shell includes a fastener skirt for fastening the applicator member on a reservoir.

10. A system, comprising:
    an applicator member for applying a liquid cosmetic, the applicator member comprising a porous core and a shell, the applicator member being obtained by:
    making the porous core out of sintered material; and
    overmolding the shell on the porous core, the shell having at least one inlet orifice for admitting the liquid cosmetic into the porous core and at least one dispenser orifice for enabling the porous core to dispense the liquid cosmetic, wherein the porous core comprises at least one projection that projects out from the overmolded shell through the at least one dispenser orifice.

11. The system according to claim 10, further comprising an applicator for the liquid cosmetic that is to be dispensed, the applicator comprising a reservoir for containing the liquid cosmetic for dispensing and the applicator member, the applicator member being assembled on the reservoir.

12. The method according to claim 1, wherein the at least one projection extends beyond an outside surface of the overmolded shell by a maximum of 5 mm.

13. The method according to claim 1, wherein the porous core receives the liquid cosmetic directly from a reservoir via the at least one inlet orifice.

\* \* \* \* \*